(12) United States Patent
Nishida

(10) Patent No.: US 7,050,202 B1
(45) Date of Patent: May 23, 2006

(54) IMAGE DATA TRANSMISSION METHOD AND APPARATUS, IMAGE DATA RECORDING METHOD AND APPARATUS

(75) Inventor: Shinsuke Nishida, Tokyo (JP)

(73) Assignee: Fourie, Inc., Tokyo (JP)

( * ) Notice: Subject to any disclaimer, the term of this patent is extended or adjusted under 35 U.S.C. 154(b) by 0 days.

(21) Appl. No.: 09/573,840

(22) Filed: May 19, 2000

(30) Foreign Application Priority Data

May 21, 1999 (JP) ................................. 11-142134

(51) Int. Cl.
*H04N 1/21* (2006.01)

(52) U.S. Cl. ................................. 358/296; 358/426.08
(58) Field of Classification Search ................ 358/296, 358/426.08–426.09, 437, 450; 379/130; 382/164, 232, 284, 132
See application file for complete search history.

(56) References Cited

U.S. PATENT DOCUMENTS

| | | | | |
|---|---|---|---|---|
| 4,314,372 A | * | 2/1982 | Bakgaard | ..................... 455/68 |
| 4,701,783 A | * | 10/1987 | Glenn | ................... 375/240.25 |
| 5,216,503 A | * | 6/1993 | Paik et al. | ................ 348/390.1 |
| 5,253,058 A | * | 10/1993 | Gharavi | ................ 375/240.12 |
| 5,303,070 A | * | 4/1994 | Christ | ........................ 358/474 |
| 5,914,755 A | * | 6/1999 | Ito et al. | ..................... 348/552 |
| 6,188,436 B1 | * | 2/2001 | Williams et al. | ......... 348/387.1 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

When transmitting at least one group of image data from a transmitter for transmitting image data or a relay apparatus for relaying image data using common wiring or frequency band having the same transmission wave, it is checked whether a total volume of the image data transmitted at the same transmission timing exceeds a maximum volume of data which can be transmitted in a frequency band. When the total volume exceeds the maximum volume, the transmission timing of a portion of the image data or at least one group of image data from among the image data transmitted at the same transmission timing is shifted temporally forwards or backwards within a time span which is undetectable by the human eyes, and thereafter the data is transmitted.

12 Claims, 17 Drawing Sheets

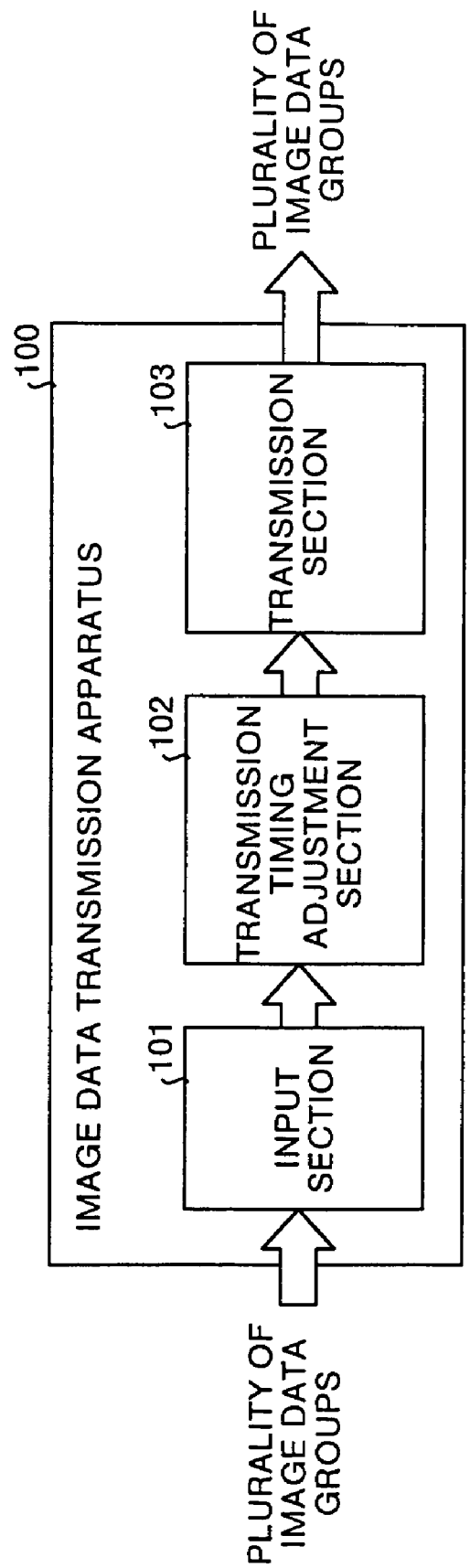

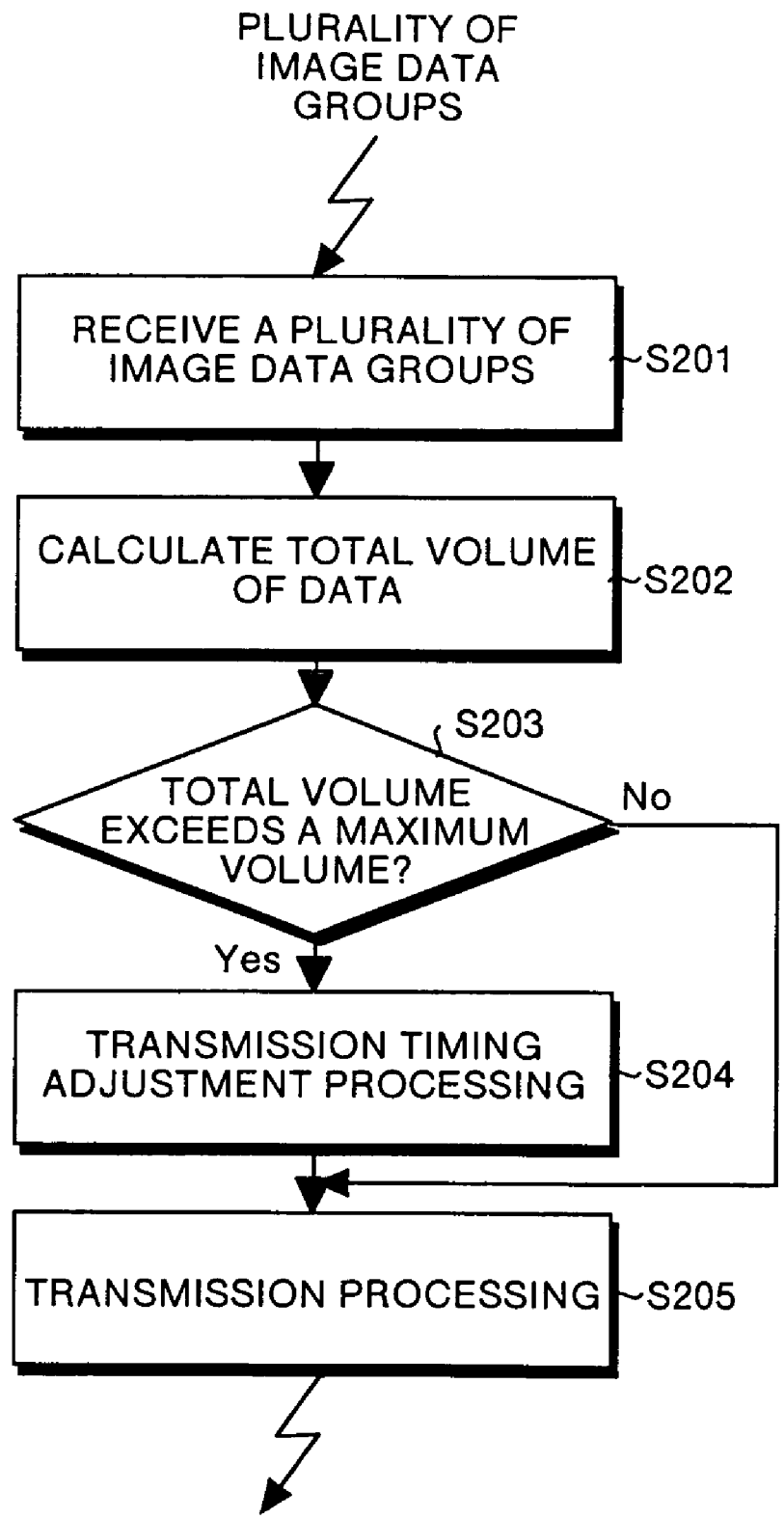

PEAK DATA FOR CHANNEL B IS SHIFTED SO AS TO BE SENT EARLIER BY TIME $-\Delta t$ (IF $\Delta t$ IS SHORT ENOUGH, THIS IS UNDETECTABLE BY THE HUMAN EYE)

IMAGE FORMAT a : CHANNEL CODE
b : TIME CODE
c : RESOLUTION LEVEL
d : ADDRESS DATA
e : DISPLAY DATA

IMAGE DATA TRANSMISSION METHOD AND APPARATUS, IMAGE DATA RECORDING METHOD AND APPARATUS

FIELD OF THE INVENTION

The present invention relates to an image data transmission method and apparatus for transmitting image data comprising an image format in which the amount of data is changed by the amount of change in an image and to an image data recording method for recording image data comprising an image format in which the amount of data is changed by the amount of change in an image. In particular, this invention relates to an image data transmission method and apparatus, and an image data recording method and apparatus for efficiently transmitting or recording image data.

BACKGROUND OF THE INVENTION

Recent years have seen the normalization of the transmission and recording of images (image data) including motion pictures and static images due to the increasing use of various types of network such as the Internet, intranet, and LAN in addition to the development of computer and communications technology and television broadcasts.

Generally, image data is characterized in that the amount of data is greater than other types of electronic information regardless of whether the data is in analog format or digital format. Therefore, when transmitting or recording image data, the amount of data to be transmitted or recorded is reduced by performing image compression. As one method of reducing the amount of image data, a method has been provided in which the consecutive frames of an image (single screens of an image) are compared and the amount of change in the image (i.e. the differential data) is extracted. After that, only the amount of change is transmitted or recorded.

However, information (data) is exchanged between organizations and between individuals using various devices. Consequently, a state often arises where a plurality of groups of image data are transmitted simultaneously using common wiring or frequency bands having the same transmission wave from transmission devices for transmitting image data or relay devices for relaying image data.

However, according to the above conventional technology, when image data is transmitted using one wiring network or frequency band having the same transmission wave, if the image format is one in which the amount of data changes with the amount of change in the transmitted image data, then when the amount of data exceeds the value of the maximum amount of data transmittable (maximum transmission volume) in that frequency band, the problem arises that part of the data or necessary image data can not be transmitted. In particular, when a plurality of groups of image data are transmitted using common wiring or frequency band having the same transmission wave, then when the peaks of the data amounts of the plurality of groups of image data coincide, the likelihood of necessary image data not being transmitted increases.

More specifically, for example, when at the same time as the screen of an image in channel A changes and the new data for the whole screen is transmitted, the screen in channel B which is being transmitted in the same frequency band changes in the same way, the amount of data in the two channels at the same instant may exceed the maximum transmission volume for that frequency band. In this case, a portion of the image data being transmitted is unable to be transmitted and the image in one channel or in both channels is disrupted.

In the above conventional technology, it is possible to avoid loss of image data. This can be achieved by limiting in advance the number of groups of image data transmitted at one time based on the value of the maximum amount of data able to be transmitted in the frequency band being used (the maximum transmission volume) and the peak amount of data of each group of image data. However, in this case, the problem arises that the efficiency of use of the one wiring network or frequency band having the same transmission wave deteriorates.

On the other hand, the optimum resolution of the image data differs depending on the maximum resolution of whichever of a plurality of receivers receives the transmitted image data. Moreover, the optimum resolution of the image data differs depending on how the image data is to be output (displayed or printed) even if the image data is received by the same receiver. However, an image data transmission method capable of corresponding in real time to the optimum resolution required by the receiver has not thus far been provided.

Furthermore, in the conventional technology, when image data comprising an image format in which the amount of data changes with the amount of change in the image is recorded on a recording medium in which the recording position changes with time, the problems arise in the same way that necessary image data may not be able to be recorded and the recording efficiency of the recording medium deteriorates.

SUMMARY OF THE INVENTION

It is an object of this invention to provide an image data transmission method and apparatus in which image data can be efficiently transmitted and in which necessary image data can be reliably transmitted, even when the amount of data changes with the amount of change in the image.

It is another object of the present invention to provide an image data transmission method and apparatus capable of corresponding in real time to the optimum resolution required by the receiver.

It is a still another object of the present invention to provide an image data recording method and apparatus in which image data can be efficiently recorded and in which necessary image data can be reliably recorded, even when the amount of data changes with the amount of change in the image.

In order to achieve the above objects, in the image data transmission method and apparatus according to one aspect of the present invention, when transmitting the image data, it is determining whether or not a total volume of image data transmitted at the same transmission timing exceeds a maximum volume that can be transmitted in a frequency band when transmitting at least one group of image data from a transmitter for transmitting image data or a relay apparatus for relaying image data using common wiring or frequency band having the same transmission wave. When the total volume exceeds the maximum volume, the transmission timing of a portion of the image data or at least one group of image data from among the image data to be transmitted at the same transmission timing temporally shifting forwards or backwards within a time span which is undetectable by the human eyes.

In the image data transmission method and apparatus according to another aspect of the present invention, when at least one group of image data is transmitted using common wiring or frequency band having the same transmission wave, a it is determined whether or not the total volume of the image data transmitted at the same transmission timing exceeds the maximum volume of data that can be transmitted in that frequency band. When the total volume exceeds the maximum volume, the transmission timings of a portion of the data or at least one group of image data from among the image data transmitted at the same timing is temporally shifted forwards or backwards. Moreover, based on the forwards or backwards shifted time Δt, the time code of the relevant image data is set at either −Δt or +Δt and transmission is performed.

In the image data recording method and apparatus according to still another aspect of the present invention, when recording at least one group of image data on the recording medium, it is determining whether or not a total volume of image data recorded simultaneously at the recording position exceeds a maximum volume of image data that can be recorded at that reading position. When the total volume exceeds the maximum volume, the recording timing of a portion of the data or at least one group of the image data from among the image data to be recorded simultaneously is shifted.

Other objects and features of this invention will become apparent from the following description with reference to the accompanying drawings.

BRIEF DESCRIPTION OF THE DRAWINGS

FIG. 1 is a block diagram schematically showing an image data transmission apparatus in which the image data transmission method according to the first embodiment is applied;

FIG. 2 is a flow chart showing image data transmission processing according to the first embodiment;

DESCRIPTION OF THE PREFERRED EMBODIMENTS

Figure 3A:
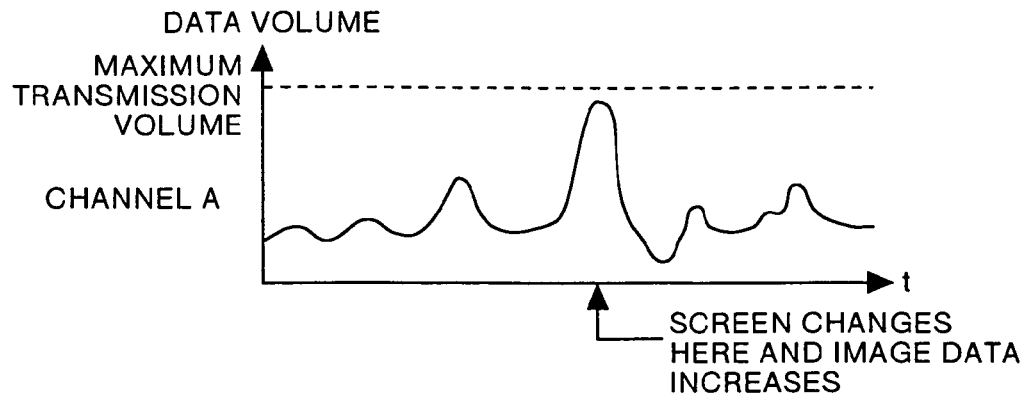
FIG. 3A to FIG. 3C are explanatory diagrams showing specific examples of the operation of the image data transmission method according to the first embodiment.

Five preferred embodiments of the image data transmission method and apparatus, and image data recording method and apparatus of the present invention will now be described below in detail with reference to the drawings.

FIG. 1 is a block diagram schematically showing an image data transmission apparatus in which the image data transmission method according to the first embodiment is applied. The image data transmission apparatus 100 has an input section 101 which receives image data to be transmitted at a particular transmission timing, a transmission timing adjustment section 102 which receives the image data from the input section 101 and performs an adjustment processing so as to adjust the transmission timing, and a transmission section 103 which receives the image data whose transmission timing has been adjusted in the transmission timing adjustment section 102 and transmits the image data using communications wiring or frequency band whose transmission waves are the same. It is assumed that the image data processed in the image data transmission apparatus 100 has an image format in which the amount of data changes with the amount of change in the original image.

The image data transmission apparatus 100 may be a transmitter which can transmit the image data or it may be a relay apparatus provided on the image data transition path. In other words, the image data transmission apparatus 100 may be any apparatus which can receive the image data for transmission and which can transmit the image data using common wiring or frequency bands having the same transmission wave.

The image data input into the input section 101 may be a single group of image data or a plurality of groups of image data. However, in the present embodiment, in order to simplify the description, it is assumed that a plurality of groups of image data are input into the input section 101.

A wired communication or wireless communication may be used as the method of inputting the plurality of groups of image data into the input section 101. Alternatively, a different input method may be used for each group of image data. Namely, the input section 101 may be provided with a function for receiving, as image data for transmitting at the same transmission timing, a plurality of groups of image data input at the same time. Similarly, wire method or wireless method may also be used when transmitting the image data by the transmission section 103. Further, it is assumed that, a plurality of groups of image data are transmitted simultaneously using common wiring or a frequency band having the same transmission wave.

The operation of the image data transmission apparatus 100 will be explained here. FIG. 2 is a flow chart showing image data transmission processing according to the first embodiment. To begin with, a plurality of groups of image data are received by the input section 101. The plurality of groups of image data received at the same time are then output to the transmission timing adjustment section 102 as image data for transmitting at the same transmission timing (step S201).

The transmission timing adjustment section 102 adds the volume of the data of each group of image data for transmission at the same transmission timing received from the input section 101 and calculates the total value of the data amounts (step S202). It is then decided whether or not the total volume exceeds the a maximum volume of data which can be transmitted in the frequency band used in the transmission section 103 (step S203). If the total volume does not exceed the maximum volume, the routine proceeds to step S205 and the plurality of groups of image data are transmitted at the same transmission timing by the transmission section 103.

If, however, the total volume exceeds the maximum volume, the routine proceeds to step S204 where transmission timing adjustment processing is executed. Namely, the transmission timing of at least one group of image data from among the plurality of groups of image data received from the input section 101 is shifted temporally forwards or backwards within a time span which is undetectable by the human eye, and is then output to the transmission section 103. For example, the transmission timing of the group of image data having the largest amount of data is set at a transmission timing shifted temporally forwards by between several nanoseconds to several microseconds. Alternatively, the transmission timing may be set at a transmission timing shifted temporally backwards by between several nanoseconds to several microseconds.

Examples of the specific operation of the first embodiment will now be described with reference to FIG. 3A to FIG. 3C and FIG. 4A and FIG. 4B. In this case, it is assumed that the image data transmission apparatus 100 is a relay apparatus and that image data in two channels, channel A and channel B, are received by the relay apparatus.

Figure 3B:
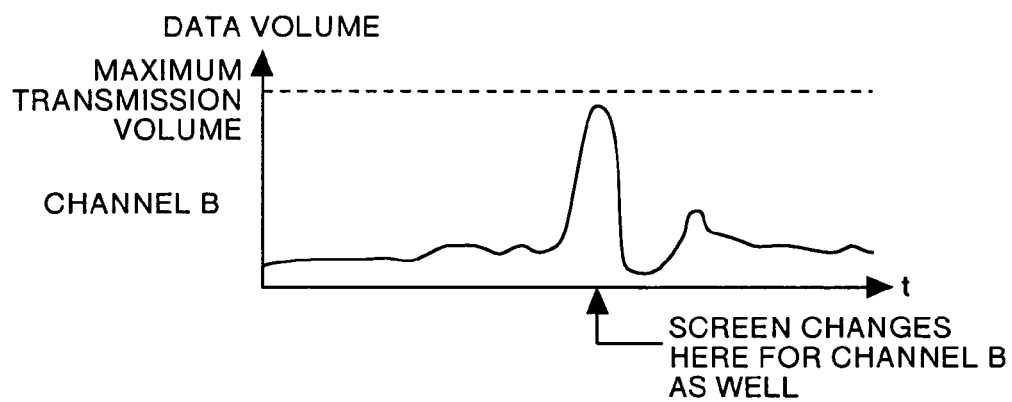

FIG. 3A shows the relationship between the amount of data and the time t in channel A. FIG. 3B shows the relationship between the amount of data and the time t in channel B. As can be seen from these figures, when the image screen changes in channel A and new data for the whole screen is transmitted, in some cases, the screen in channel B which is being transmitted on the same frequency band changes in the same way at the same time.

Figure 3C:
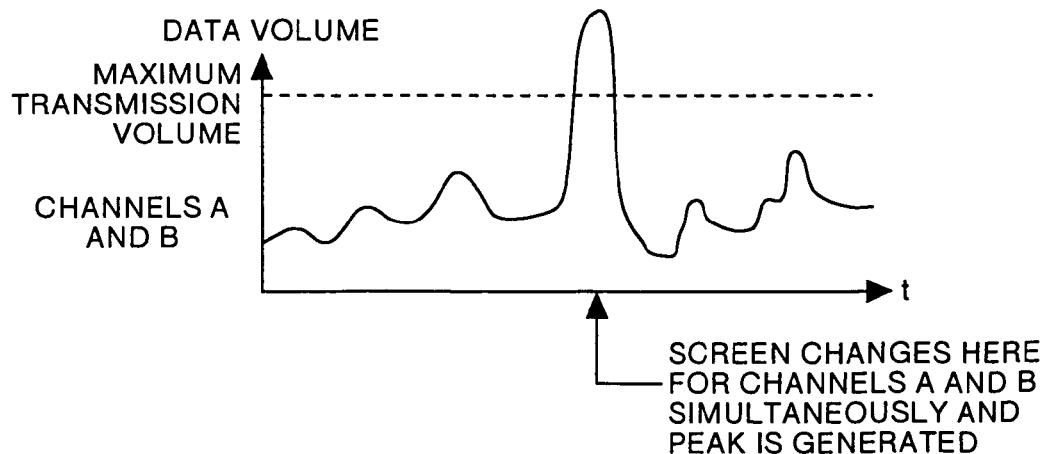

At such a case, as shown in FIG. 3C, sometimes the value of the combined amounts of data of the two channels at the same moment exceeds the maximum value for the frequency band (the maximum transmission volume). In the conventional image data transmission method, in a case such as this, a portion of the image data which exceeds the maximum value can not be transmitted and the image in one channel or in both channels is disrupted.

Figure 4A:
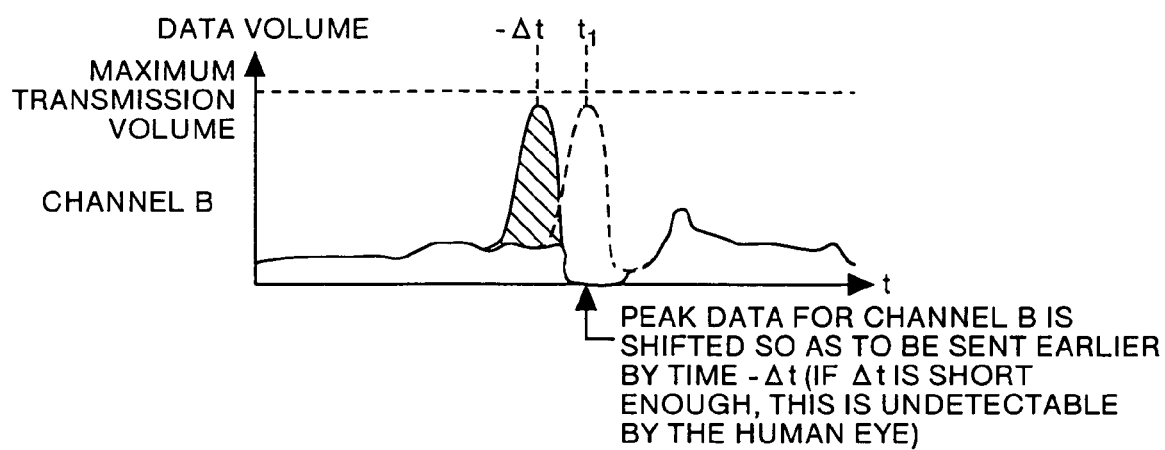
FIG. 4A and FIG. 4B are explanatory diagrams showing further specific examples of the operation of the image data transmission method according to the first embodiment.
Figure 4B:
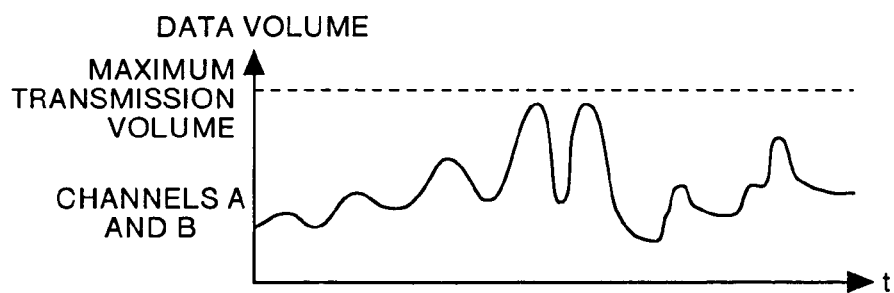

However, in the first embodiment, as is shown in FIG. 4A, the transmission timing of the data peak in channel B (the data at the position of the time t1) is shifted by the transmission timing adjustment section 102 by a time $-\Delta t$ so as to be sent earlier. As a result, as is shown in FIG. 4B, when the image data is transmitted from the transmission section 103, the value of the combined amounts of data of the two channels at the same moment does not exceed the maximum value for the frequency band (the maximum transmission volume). Moreover, even when amount of the image data changes with the amount of change in the image, it is possible to efficiently transmit a plurality of groups of image data simultaneously and to ensure that necessary image data is transmitted.

Furthermore, for example, even when image data in channel B is received by the receiver and this image data is played back (i.e. displayed) in real time, the human eyes are unable to detect the time difference ($\Delta t$) and the image data can be used without any problem.

Note that, in the above described first embodiment, the example described was one in which a plurality of groups of image data were received by the image data transmission apparatus 100, however, even when only one group of image data is received, if the image data is in an image format in which the amount of data changes with the amount of change in the image, then data peaks are generated and may exceed the maximum value for the amount of data which can be transmitted by the transmission section 103. Further, because the amount of data normally varies, in the same way, an effective transmission method is necessary. It is clear that, by applying the image data transmission method of the first embodiment to these problems, they can be solved in the same way as for a plurality of groups of image data.

In the image data transmission method according to the second embodiment of the present invention, when at least one group of image data is transmitted using common wiring or frequency band having the same transmission wave, a it is determined whether or not the total volume of the image data transmitted at the same transmission timing exceeds the maximum volume of data that can be transmitted in that frequency band. If the total volume exceeds the maximum volume, the transmission timings of a portion of the data or at least one group of image data from among the image data transmitted at the same timing is temporally shifted forwards or backwards. Moreover, based on the forwards or backwards shifted time $\Delta t$, the time code of the relevant image data is set at either $-\Delta t$ or $+\Delta t$ and transmission is performed.

Figure 5:
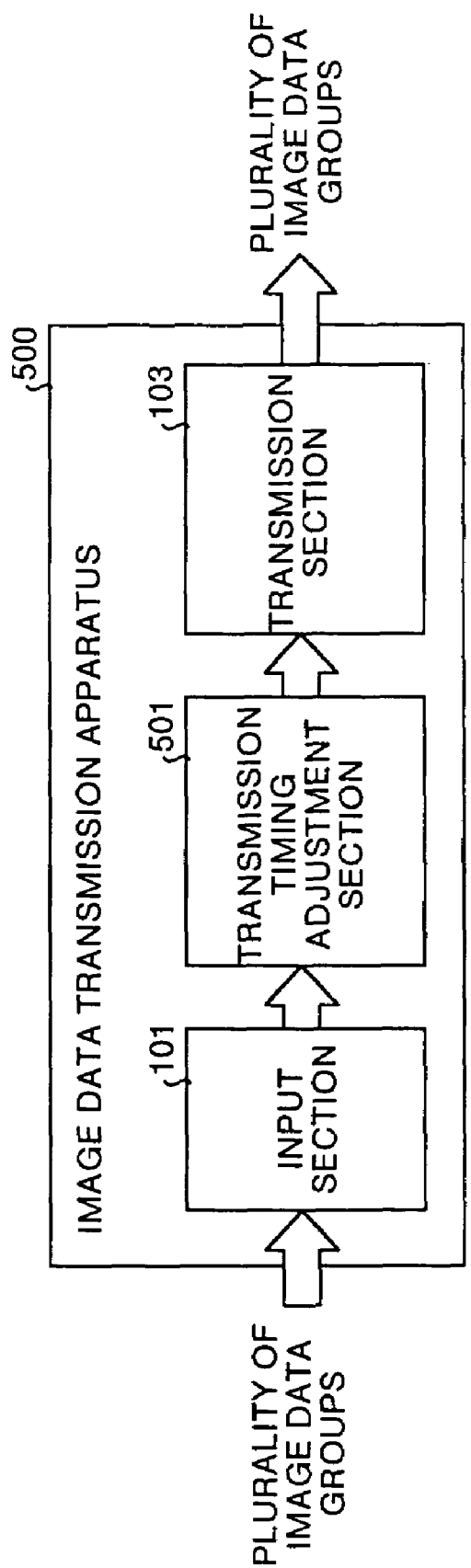
FIG. 5 is a block diagram schematically showing an image data transmission apparatus in which the image data transmission method according to the second embodiment is applied.

FIG. 5 is a block diagram schematically showing an image data transmission apparatus in which the image data transmission method according to the second embodiment is applied. The structural elements that are the same as those in the first embodiment are given the same descriptive symbols and a description thereof is omitted. In the present embodiment, only those elements that are different will be described.

This image data transmission apparatus 500 has the input section 101, a transmission timing adjustment section 501 which receives the image data from the input section 101 and performs an adjustment processing so as to adjust the transmission timing, and the transmission section 103. Note that image data processed in the image data transmission apparatus 500 has a time code representing a list of time series for each group of data forming the image data as well as an image format in which the amount of data changes with the amount of change in an image.

Figure 6:
FIG. 6 is an explanatory diagram showing an image format of image data used in the second embodiment.

At this point, the image format of the image data used in the second embodiment will be explained here with reference to FIG. 6. As shown in FIG. 6, the image format comprises a channel code for classifying image channels of the data; a time code for specifying a playback timing of the data; a resolution level representing a resolution of the data; address data representing a position of image data of the data within a screen; and display data for the data. In the second embodiment, the image data is represented with the data structure of this image format taken as one unit. Note that in the description below, the image format data of one unit is described as an image data factor.

In the second embodiment, one or more of the above image data factors are collected to represent an image. A channel code is attached to the image data factors and even when image data of a plurality of channels is transmitted simultaneously, using the codes for the channels, the receiver can fetch the image data of the necessary channel by checking the channel code.

The same time code is prepared for simultaneous image data factors. Note that it is also possible for the definition and method of the time code to be different for each channel. In other words, during transmission, when data is moved forwards or backwards by time $\Delta t$, a time code used by the sending side only in a transmission may be attached, and an operation corresponding to $\Delta t$ performed. Removing this time code used only in transmission from the receiving side makes it possible to use an optional time code specification for each channel allowing the independence of each channel to be maintained. Further, the resolution level is information representing the resolution of the unit of data and, in the second embodiment, uses a division level described later to represent a resolution.

Moreover, it is possible to use an independent description to represent each of the channel codes, time codes, and display data in the image format, however, the resolution data and the address data need the considerations described below.

Next, the setting of the address data representing the position of each group of image data within a screen will be described with reference to FIG. 7A to FIG. 7D. In the second embodiment, a division mode is employed in which image data is divided into a plurality of block screens and a first address is allocated to each divided block screen. Each block screen designated by a first address is further divided and a second address is allocated to each of these divided block screens. Thereafter, division and address allocation are repeated an optional number of times and first addresses and thereafter second addresses allocated, thus enabling address data to be set.

Figure 7A:
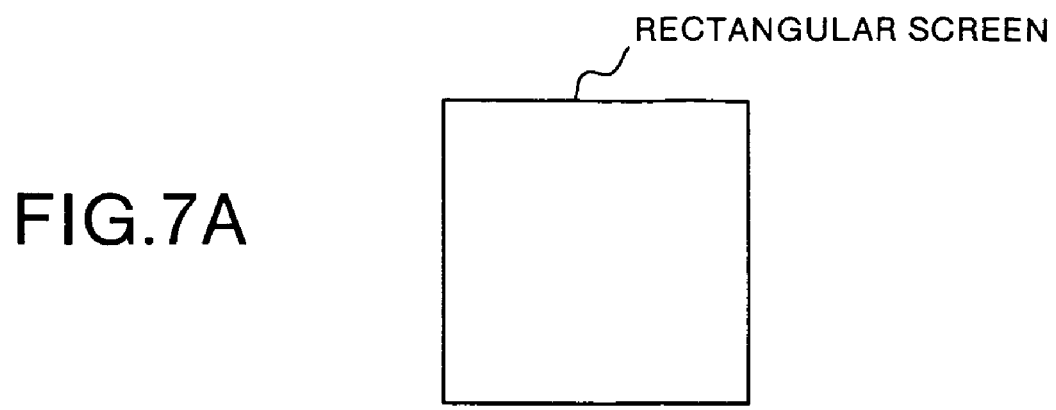
FIG. 7A to FIG. 7D are explanatory diagrams showing structures of address data of an image format used in the second embodiment.

More specifically, address data in the image format of the second embodiment is generated and set by the following process. Firstly, the rectangular screen shown in FIG. 7A is prepared. The top left corner of this rectangular screen is set as the origin and the top left corner of the first screen of the image data is matched with this origin. The rectangle of the image data screen often has various aspect ratios, however, regardless of the shape of the image, it can be expressed on a rectangular screen by setting the top left edge as the point of origin.

Figure 7B:
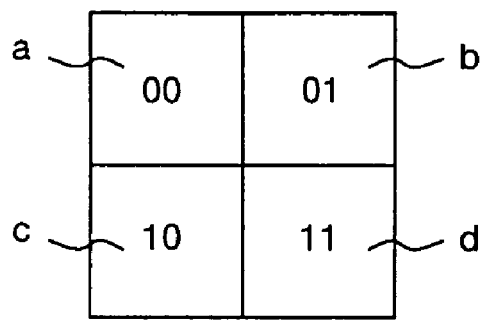

The screen in FIG. 7A is divided into four blocks which are set as a to d as division level 1. As is shown in FIG. 7B, from the top left to bottom right these blocks are allocated the addresses "00", "01", "10", and "11". These blocks are further divided as division level 2 and addresses are allocated thereto in the same manner. In other words, the block a with the address "00" in FIG. 7B is further divided into blocks e, f, g, and h, as shown in FIG. 7C, which are then allocated the addresses "0000", "0001", "0010", and "0011".

Figure 7C:
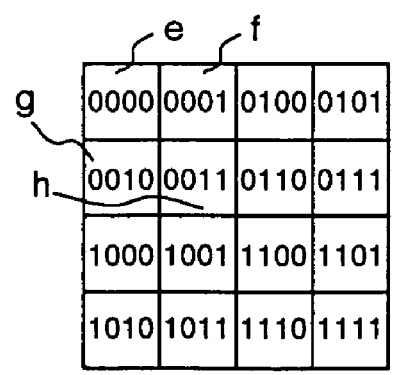
Figure 7D:
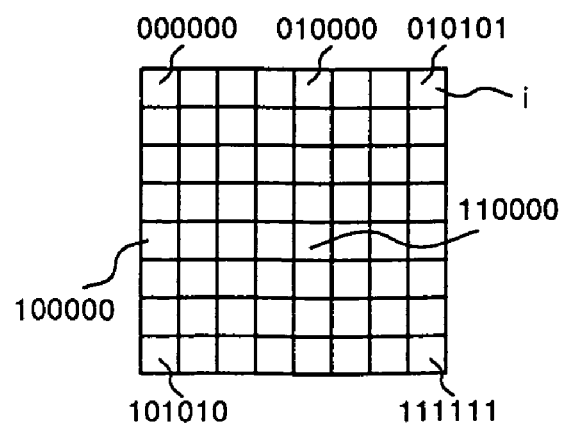

FIG. 7D shows a case in which the blocks shown in FIG. 7C are further divided as division level 3. For example, the block i positioned at the top left corner is allocated the address "010101". If the division level is n, the screen is vertically and horizontally divided into $2^n$ divisions. The number of blocks obtained by this division is $2 \times 2^n$ and the addresses of the blocks are represented by a bit width of 2n. The non-divided state of FIG. 7A represents the case when n=0. Of course, it is not absolutely necessary to perform this type of division and address allocation whenever the present invention is implemented.

Image data factors with addresses allocated thereto are generated in advance by the above described method. Note that, areas often exist where identical data runs together in the image data. For example, in a scene having the same color, a wide area of the screen has the same color data. In such a case, the ratio of the amount of the whole screen occupied by the same data is determined and divided addresses are allocated. In reality, in an address which is divided still further, image data factors are formed by performing the determination to a division level at which only the same data is obtained and then setting the address. As an extreme case, if the data for the entire screen is the same, then only one image data factor with no address designated is set. In this case, it is possible to set the division level at 0 (i.e. no division) and not allocate any address. In the reverse case, when the image data is highly detailed, the division level is advanced and the division address has a long bit width. Image data input in this way comprises a group of image data factors with addresses allocated for each division level.

Note that the above division level n represents the number of divisions n by which an image data screen is divided into a plurality of block screens. Accordingly, the division level n represents the resolution of the division block screens generated by the number of divisions n and, therefore, the division level and the resolution level can be described with the same definition.

Figure 8:
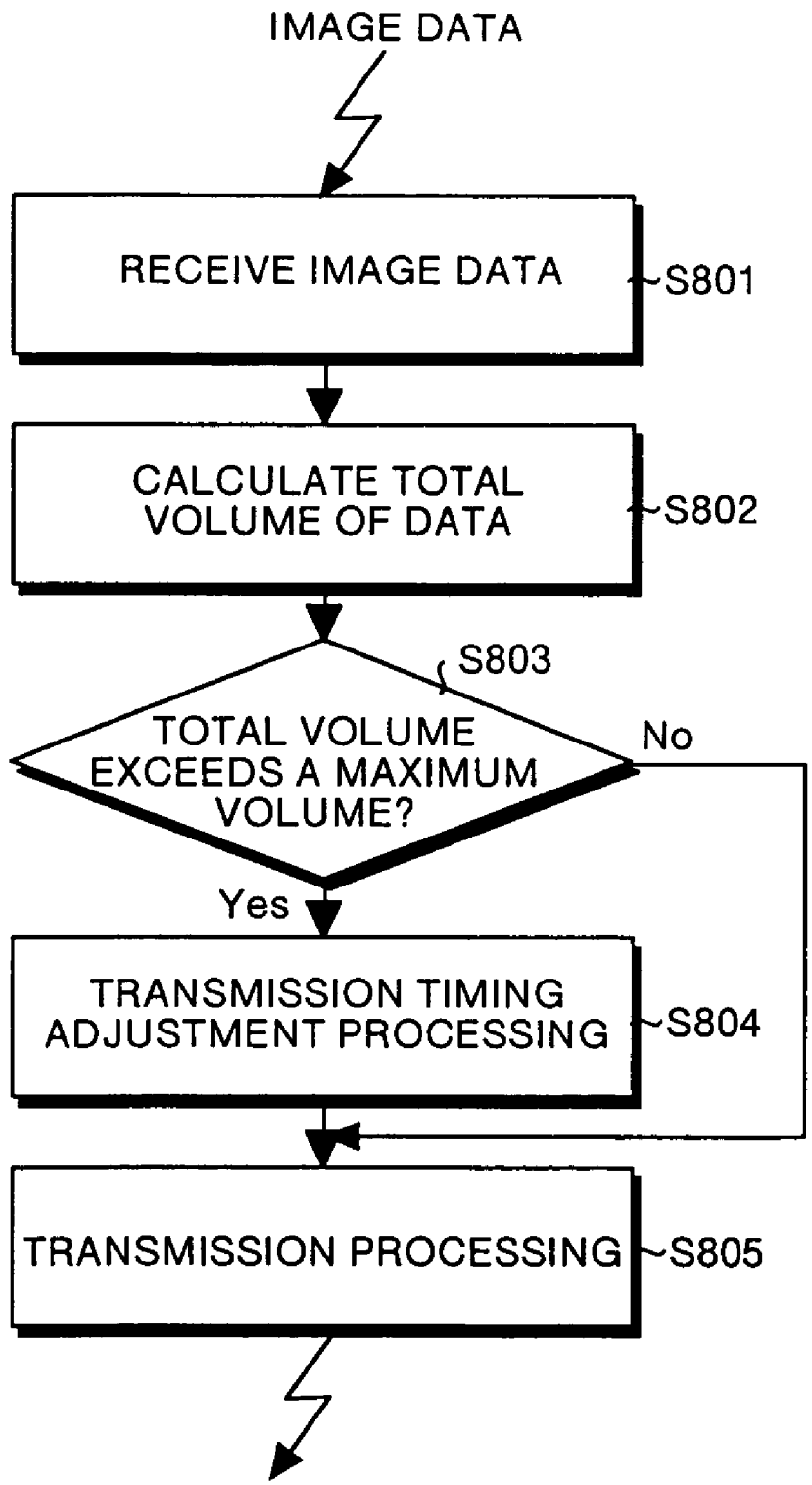
FIG. 8 is a flow chart showing image data transmission processing according to the second embodiment.

The operation of the image data transmission apparatus 500 will now be described. FIG. 8 is a flow chart showing the image data transmission processing of the second embodiment. To begin with, image data is received by the input section 101 and image data input at the same time is output to the transmission timing adjustment section 501 as image data for sending at the same transmission timing (step S801). The data input at this point may be a single group of image data or a plurality of groups of image data. In other words, the image data input at the same time represents the number of groups of image data and more strictly also represents the groups of image data factors input at the same time.

The transmission timing adjustment section 501 adds the volume of each group of image data to be transmitted at the same transmission timing (namely, each image data factor group) received from the input section 101 and calculates a total volume of the data (step S802). It is then determined whether or not the total volume exceeds a maximum volume that can be transmitted in the frequency band used by the transmission section 103 (step S803). If the total volume does not exceeded the maximum volume, the routine proceeds to step S805 and the plurality of image data factors are transmitted at the same transmission timing by the transmission section 103.

If, however, the total volume does exceed the maximum volume, the routine proceeds to step S804 where transmission timing adjustment processing is executed. Namely, the transmission timings of at least one of the groups of image data factors from among the plurality of groups of image data factors input by the input section 101 is temporally shifted forwards or backwards. Moreover, based on the forwards or backwards shifted time $\Delta t$, the time code of the relevant image data factor is set at either $-\Delta t$ or $+\Delta t$.

An example of the specific operation of the image data transmission method will now be given in the second embodiment with reference to FIG. 9A, FIG. 9B and FIG. 10 through FIG. 12. The image data transmission apparatus 500 is considered as a relay apparatus and it is assumed that image data is received in two channels, channel X and channel Y, in the relay apparatus. Further, in the figures, in order to make it easier to understand the amounts of image data in each channel, the image data factors forming the image data are represented as blocks and the image data factors of channel Y are given a shaded background.

Figure 9A:
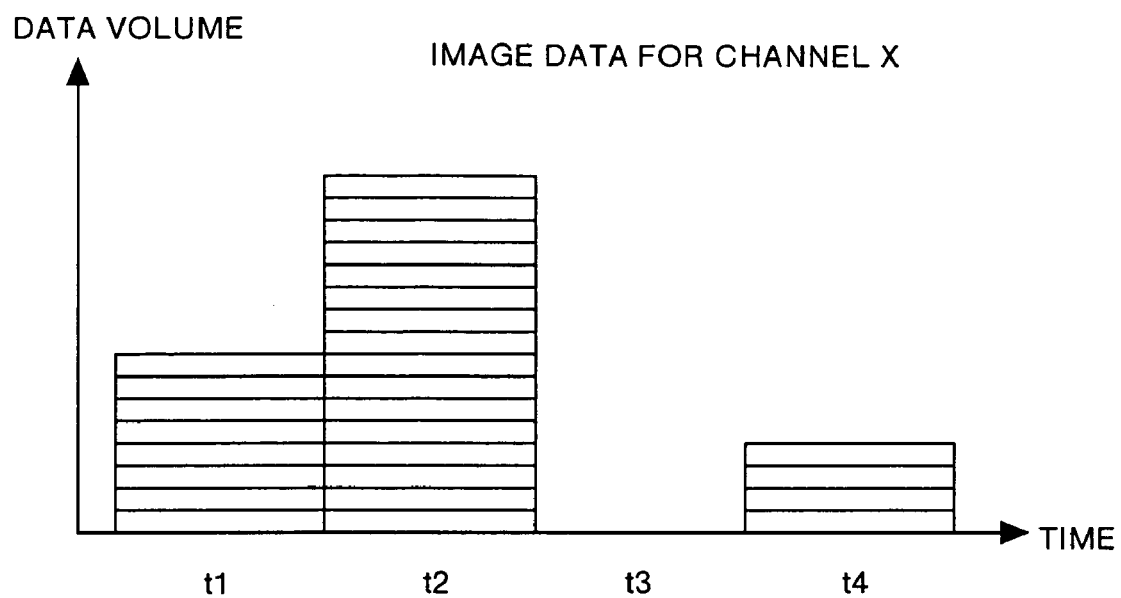
FIG. 9A and FIG. 9B are explanatory diagrams showing specific examples of the operation of the image data transmission method according to the second embodiment.
Figure 9B:
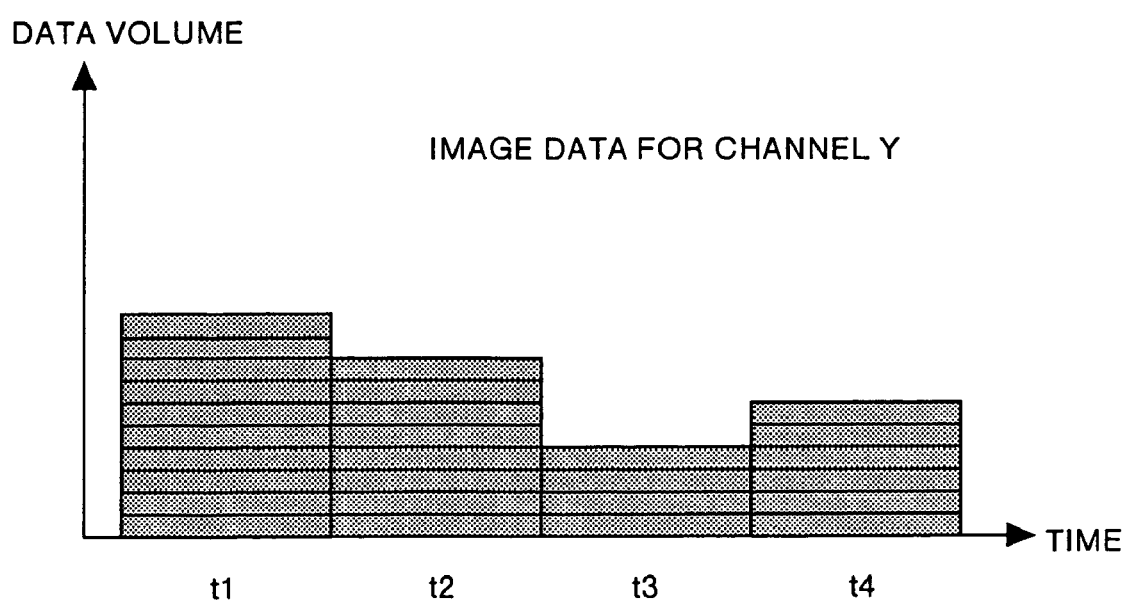
Figure 10:
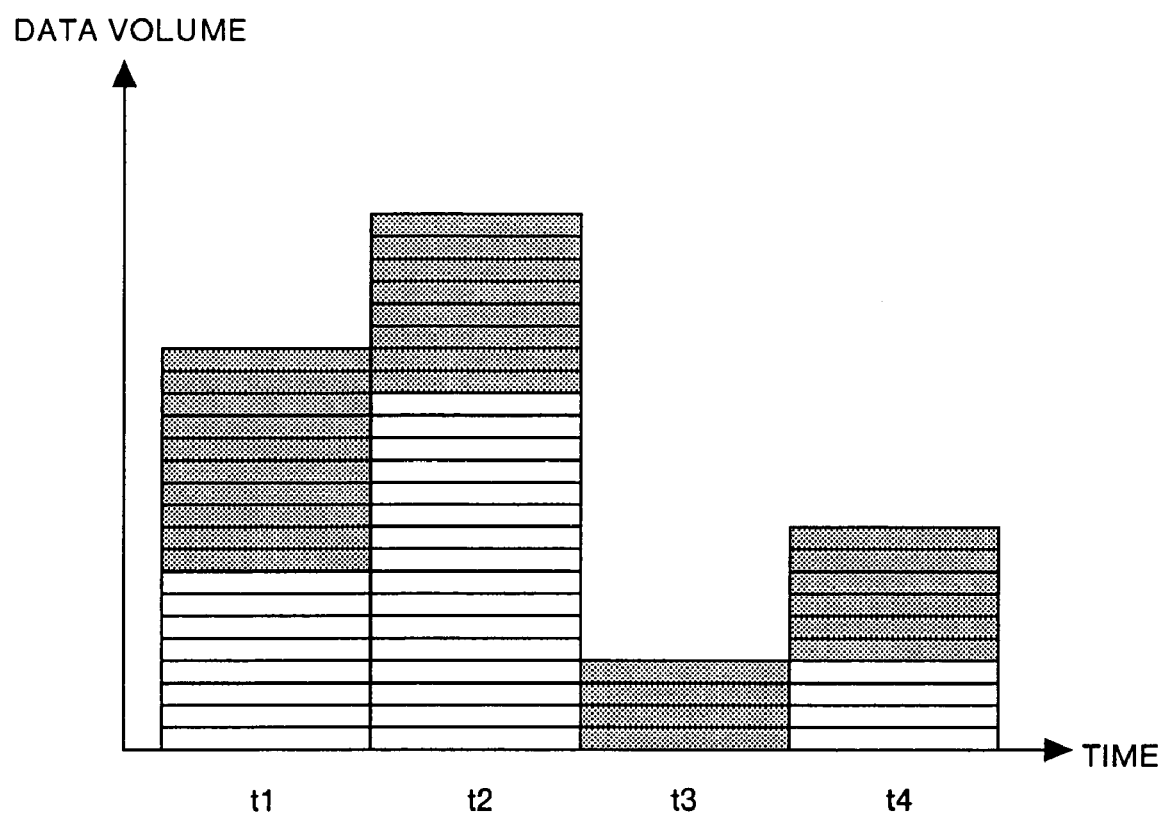
FIG. 10 is an explanatory diagram showing a further specific example of the operation of the image data transmission method according to the second embodiment.
Figure 11:
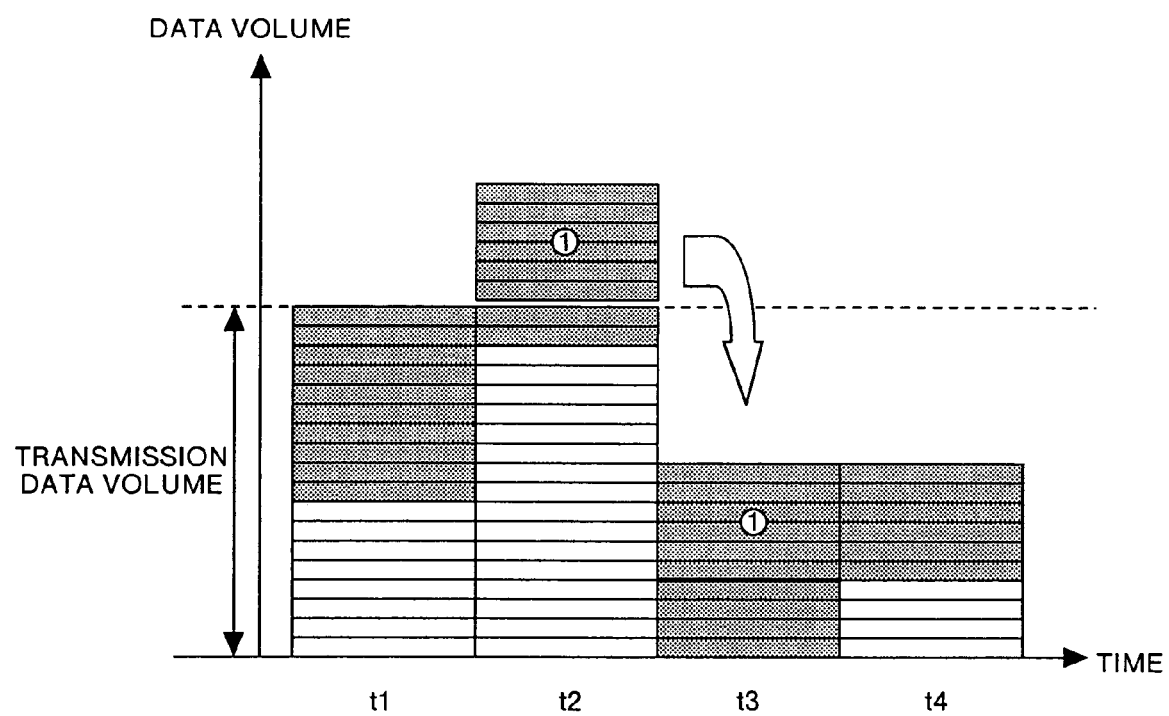
FIG. 11 is an explanatory diagram showing yet a further specific example of the operation of the image data transmission method according to the second embodiment.
Figure 12:
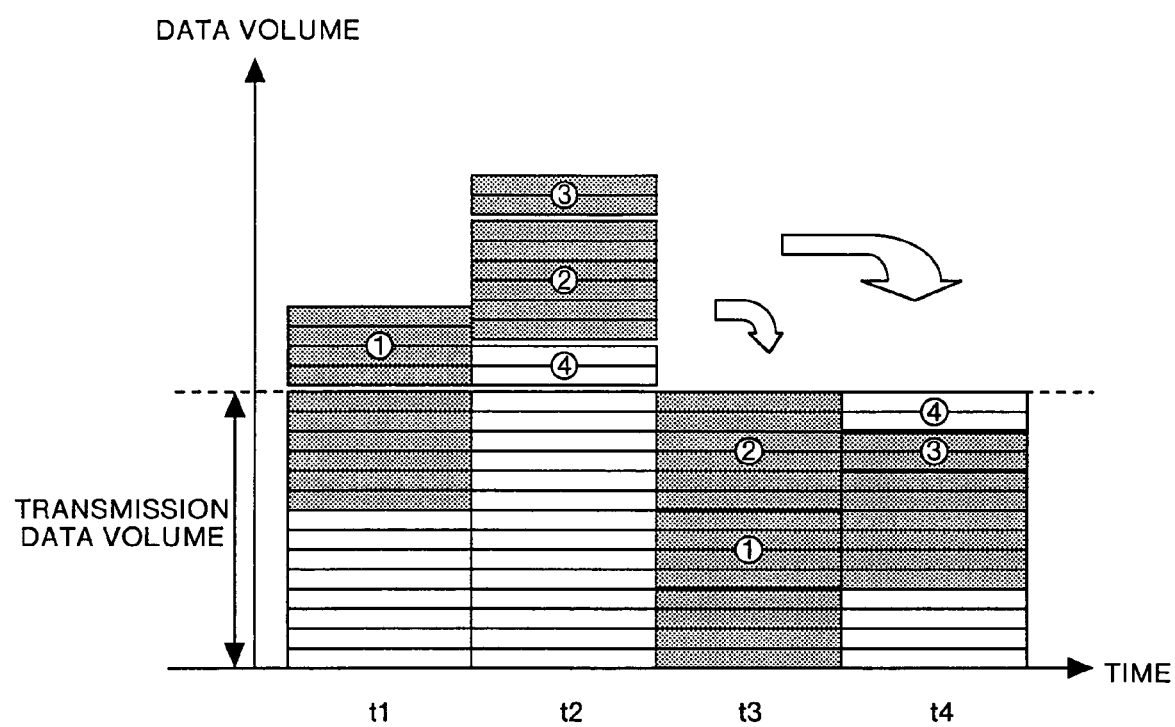
FIG. 12 is an explanatory diagram showing yet another specific example of the operation of the image data transmission method according to the second embodiment.

FIG. 9A shows a relationship between the amount of data in channel X and the time t. FIG. 9B shows a relationship between the amount of data in channel Y and the time t. FIG. 10 shows a relationship between the amount of data and the time t when the image data of both the channels simply combined and output. FIG. 11 shows a first processing for when a momentary data amount of the data amounts of both channels exceeds the maximum value of the volume of data which can be transmitted in this frequency band (i.e. the maximum transmission volume). FIG. 12 shows a second processing for when a momentary data amount of the data amounts of both channels exceeds the maximum value of the volume of data which can be transmitted in this frequency band (i.e. the maximum transmission volume).

For example, when the image data of channel X and channel Y shown in FIG. 9A and FIG. 9B is input into the image data transmission apparatus 500, the amounts of the synthesized image data at times t1 through t4 generate a peak at the time t2 as shown in FIG. 10. At this time, if the amount of data at this peak does not exceed the maximum value of the volume of data which can be transmitted in this frequency band (i.e. the maximum transmission volume) by the transmission section 103, the synthesized data of channel X and channel Y is output from the transmission section 103 as it is.

If, however, the amount of data at this peak does exceed the maximum value of the volume of data which can be transmitted in this frequency band (i.e. the maximum transmission volume) by the transmission section 103, then, as is shown in FIG. 11, the data of the portion which exceeds the transmission data volume (i.e. the six image data factors of channel Y shown in a shaded background) is shifted from the time t2 to the time t3 and transmitted. Human vision has the characteristic that it is unable to accurately detect extremely fast movement and is also subject to after image phenomenon. Therefore, the shift is of the order of several tens of nanoseconds to several microseconds, which time is undetectable by human eyes. In this case, information from a wide screen area which appears as a large movement to the human eyes, namely, in the second embodiment, data of a low division level, is shifted by as short a time as possible (e.g. several tens of nanoseconds). Data of a high division level has a small screen area on a screen and cannot be accurately detected by the human eye. Therefore, it is shifted by a comparatively long time (e.g. several microseconds). Because transmission speeds have recently improved remarkably, the great effect of efficient use of the transmission path is obtained, even when the shift is of the order of several tens of nanoseconds.

As another example of the processing when the amount of data at the peak exceeds the maximum value of the volume of transmission data which can be sent by the transmission section 103 (i.e. the maximum transmission volume), the time code of the image format of the second embodiment can be operated and the shift made large enough to detect by the human eye and transmission performed. Namely, because a time code is attached to the image data factors, this time code is temporarily altered and is moved by a large distance forwards or backwards along the time axis, thus smoothing the transmission data. The time code is restored after reception by the receiver and the original image is played back. Because there is no limit as to the detectability or otherwise by the human eyes in this method, the shift can be enlarged and a higher transmission efficiency achieved. In other words, the transmission of data on a narrower transmission path becomes possible. Note that, in the second embodiment, a structure is employed in which the image format is provide in advance with a time code, however, in still another method, the time code to be shifted may be added only during the transmission. In this case, the time code is removed from the receiver.

For example, as shown in FIG. 12, when image data factors which exceed the transmission data volume are present at the time t1 and the time t2, by operating the time code, the data of the time t1 is moved to the time t3, and, in the same way, the data of the time t2 is moved to the times t3 and t4. In FIG. 12, image data factors that exceed the transmission data volume are moved so as to be transmitted with data to which they are temporally close. Accordingly, the time difference $\Delta t$ of the movement is shortened. However, because the image data factors are restored by the time code, as described above, it is possible for the time $\Delta t$ to be a large shift which is detectable by the human eyes. In other words, even when the transmitted data is linked together so as to exceed the transmission data volume, the transmission can be moved to a time (namely, a transmission timing) when the amount of data is low and the transmission can be reliably performed. Moreover, if the shift is performed starting from high resolution (large division level) image data factors, namely from factors in which the image is finely detailed, even if the restoration does not go properly, the effect is minimal.

In FIG. 12, the time code of the image data factor of the time t1 that is moved to the time t3 is set as "$-\Delta t$ (wherein $\Delta t = |t3-t1|$)", the time code of the image data factor of the time t2 that is moved to the time t3 is set as "$-\Delta t$ (wherein $\Delta t=|t3-t2|$)", and the time code of the image data factor of the time t2 that is moved to the time t4 is set as "$-\Delta t$ (wherein $\Delta t=|t4-t2|$)".

Accordingly, in the second embodiment, in the same way as in the first embodiment, in cases such as when a momentary amount of data of two channels combined exceeds the maximum value for the frequency band (the maximum transmission volume), because the transmission timing is adjusted in advance by the transmission timing section 501 such that the transmission is shifted by an amount $-\Delta t$ or $+\Delta t$, the momentary amount of data of the two channels combined does not exceed the maximum value for the frequency band (the maximum transmission volume) when transmitting from the transmission section 103, and even when the image data is data whose amount changes together with the amount of change in an image, the image data can be efficiently transmitted and the transmission of necessary data ensured.

Moreover, when the shifting is performed using time codes, when the image data of the channel Y is received by a receiver and this image data is played back, it is possible for the playback to be performed at a suitable timing using the time codes of the image data factors. Therefore, the image data can be used without any problems. Further, in this case, because the image data is played back precisely by the time code, the transmission timing adjustment processing in the transmission timing adjustment section 501 has a large degree of flexibility.

Furthermore, when a time code is used, it is possible to perform transmission earlier or later in units of seconds.

Naturally, in this case, by shifting the playback of the relevant image data by the receiver (i.e. by the playback apparatus) in units of seconds, proper playback can be performed.

Still further, it is also possible to combine the method of shifting within the range detectable by the human eye and the method using a time code. As a result, the transmission timing adjustment processing when the total volume exceeds the maximum volume is further simplified and the further effect is achieved that volume of data can be made more uniform. In particular, this is effective when transmitting image data from several tens of channels to several hundreds of channels over the radio wave bands of as few frequency bands as possible.

Moreover, when packet transmission is used for the image data transmission, the amount of packet data is made more uniform thus providing an increase in transmission efficiency.

Figure 13:
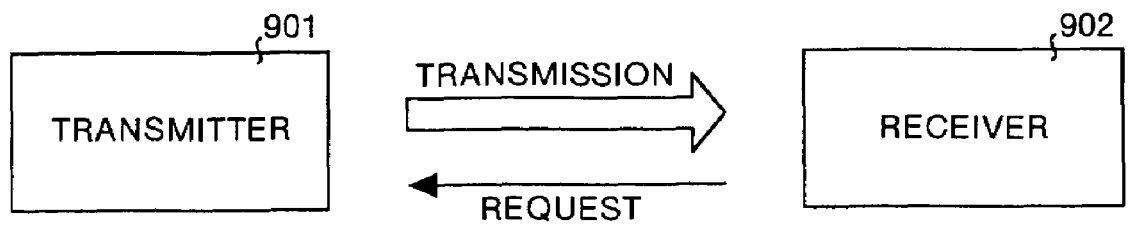
FIG. 13 is a block diagram schematically showing an image data transmission system in which the image data transmission method according to the third embodiment of the present invention is applied.

FIG. 13 is a block diagram schematically showing an image data transmission system in which the image data transmission method according to the third embodiment of the present invention is applied. In this third embodiment, when image data is transmitted from a transmitter 901, a plurality of frequency bands are used and image data having a different resolution level is sent on each frequency band. The image data of the desired frequency level is received by selecting the frequency band for reception with the receiver 902. Note that the image data used in the third embodiment has the same image format as that used in the second embodiment.

Figure 14:
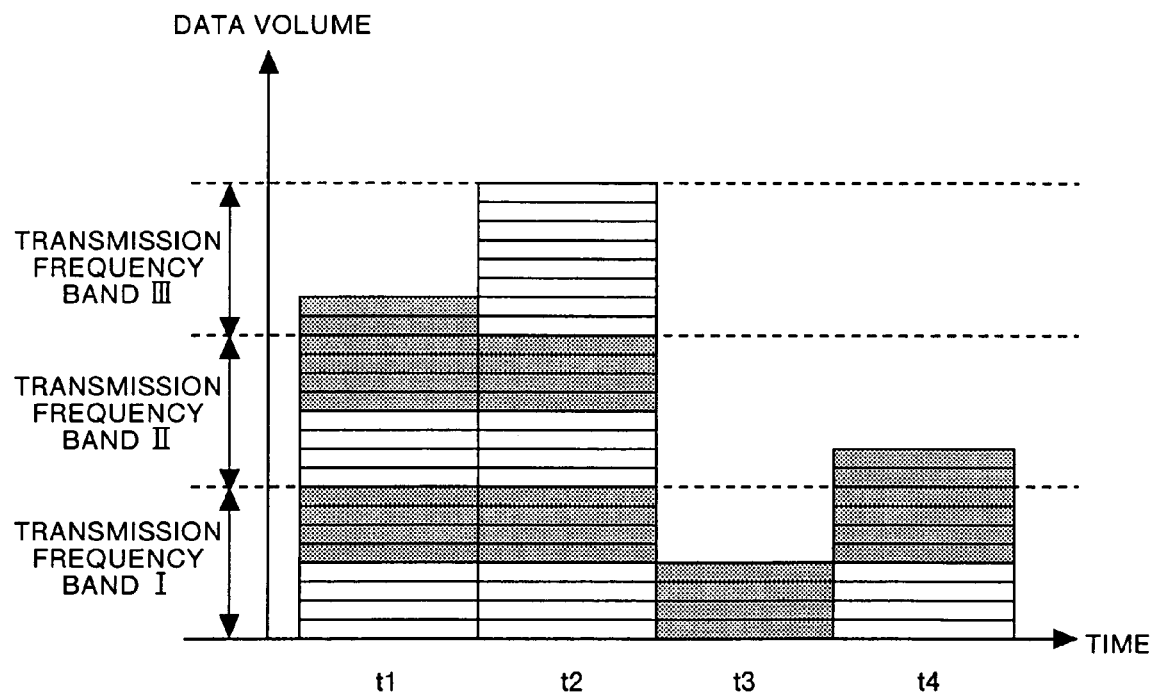
FIG. 14 is an explanatory diagram showing an image data transmission method according to the third embodiment.

As shown in FIG. 14, for example, when transmitting on a radio wave, a particular 6 mega frequency band is prepared for transmitting the image data. In this case, the transmitter 901 transmits image data of division level 0 to division level 9 on the first 2 mega frequency band I. Image data of division level 10 to division level 19 is transmitted on the next 2 mega frequency band II and image data of division level 20 to division level 29 is transmitted on the next 2 mega frequency band III. FIG. 14 shows a case when the image data of two channels is transmitted simultaneously with the image data factors of one group of image data shown as white blocks and the image data factors of the other group of image data shown as shaded blocks.

The receiver 902 receives the frequency band of the level at the maximum resolution of the display device built into the receiver. For example, if the receiver has a 20 inch display device with a maximum display resolution up to division level 18, the received frequency band is the first 2 mega frequency band I and the second 2 mega frequency band II. If the display device is of a large size capable of a maximum display resolution up to division level 30, the total 6 mega three frequency bands (frequency bands I to III) are received.

In a 20 inch display device, if the viewer wishes to zoom in and enlarge only one particular screen of a particular channel, then it is possible to receive the next frequency band for this time only. In this way, image data is transmitted from the transmitter 901 using different frequency bands for different division level groups (in other words, resolutions) and selected the frequency band by the receiver 902, and it is possible to provide the optimum resolution requested by the receiver 902 in real time.

It is also possible for the receiver 902 to request the necessary division level (resolution level) or frequency band from the transmitter 901. In this case, in response to the request, the transmitter 901 prepares a wide frequency band when sending high resolution data. When not sending high resolution data, the frequency band is narrowed enabling the freed area to be used for the transmission of other data. In this way, the frequency bands can be efficiently used.

Note that, in the third embodiment, a method in which the transmission frequency bands I to III were partitioned as 2 mega bands, however, it is also possible to partition the transmission frequency bands by transmission frequency. For example, transmission frequency band I may be set for low reference frequencies, transmission band II may be set as a frequency band for frequencies higher than the reference frequency, and transmission frequency band III may be set as a frequency band for still higher frequencies. Because the frequencies can be separated more finely, it is possible to employ a method in which the frequency is raised each time the resolution (division level) increases. A method in which frequency data is superposed and sent such as with an FM wave can also be considered. However, when the receiver requests a resolution, it is simpler to send a resolution request by the method in which the transmission bands are partitioned in frequency bands rather than by the method in which the frequency is raised more finely each time the resolution (division level) is raised.

In the image data transmission method according to the fourth embodiment of the present invention, low resolution image data is transmitted at a slower transmission speed and high resolution image data is transmitted at a faster transmission speed. The basic structure of the fourth embodiment is the same as that of the second embodiment. Therefore, only those portions that are different will be described here.

In both wire and wireless transmission, transmission performance is at maximum when there is little noise and the like on the transmission path. When there is a lot of noise, or when the operations of the receiver and/or transmitter are unstable, the transmission speed is controlled so as to remain slow. Moreover, when the amount of transmission data increases on a transmission path on which a plurality of data transmissions are performed, the speed of each data transmission is slowed. In order to perform high speed transmission of various types and sizes of data and the like using wire or wireless telephone lines, as long as the line is not a dedicated line, the only method possible is to vary the transmission speed of each transmission depending on the state of congestion of the transmission path.

Figure 15:
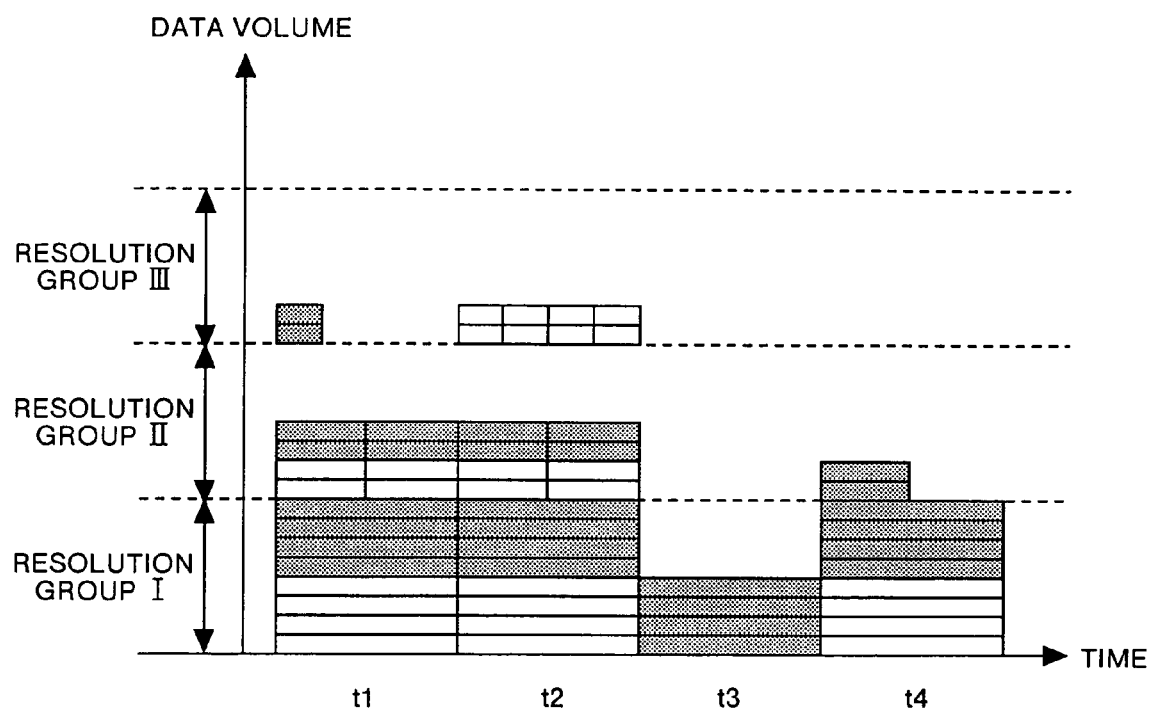
FIG. 15 is an explanatory diagram showing an image data transmission method according to the fourth embodiment.

As shown in FIG. 15, in the fourth embodiment, an image data transmission method is provided in which transmission is performed with the transmission speed changed for different resolutions. This equates to the method described in the third embodiment, in which different frequencies were used to transmit different resolutions, however, in reality, a transmission method in which the transmission speed changes randomly is becoming the mainstream for both wire and wireless transmissions. Consequently, changing the transmission speed for different resolutions is more suited to current conditions than changing the frequency for different resolutions. For example, rough portions of an image (portions having a low resolution) are transmitted at 9600 bps, while detailed data having a resolution above a particular high level is sent at 64 kbps. In this case, when the transmission speed drops to 9600 bps, only low resolution images are transmitted. Accordingly, although the resolution of the image is lowered, interruption of the screen and the like can be avoided.

In other words, in this method, when the transmission speed is slow, preference is given to the transmission of image data factors having a large division level. When the transmission speed is fast, image data factors having a fine division level are also transmitted. The transmission speed is changed arbitrarily partway on the line controlling the transmission, therefore, the transmitter obtains feedback of the transmission speed and transmits image data factors of different resolutions at separate speeds.

In FIG. 15, image data factors of a large division level, which is shown as resolution group I, are transmitted at a slow transmission speed. Image data factors of the next division level shown as resolution group II are transmitted at a fast transmission speed. Image data factors of a fine division level shown as resolution group III are transmitted at a still faster transmission speed. Note that, in FIG. 15, the width of the blocks representing the image data factors becomes less in the order of resolution group I to resolution group II and then to resolution group III. This is intended to represent the fact that, because the transmission speed is faster, the time taken to transmit the image data factors is shortened. FIG. 15 also shows a case in which the image data of two channels is transmitted simultaneously. The image data factors of one image data group are shown as white blocks while the image data factors of the other image data group are shown as shaded blocks.

In FIG. 15, the vertical axis is the amount of data, however, it is also possible for the vertical axis to represent transmission speed with image data factors lined up from the bottom in order of increasing division level size providing a method in which the transmission speeds can be varied still more finely. Namely, in the above method, each time the resolution level is raised, the transmission speed is raised still more finely. However, when the resolution is requested by the receiver, it is simpler to issue a resolution request using the method in which the transmission speed bands are allocated to the resolution groups I to III than the method in which the transmission speed is finely raised each time the resolution level is raised. The receiver requests a transmission speed in accordance with the necessary resolution, for example, 9600 bps and the like.

Figure 16:
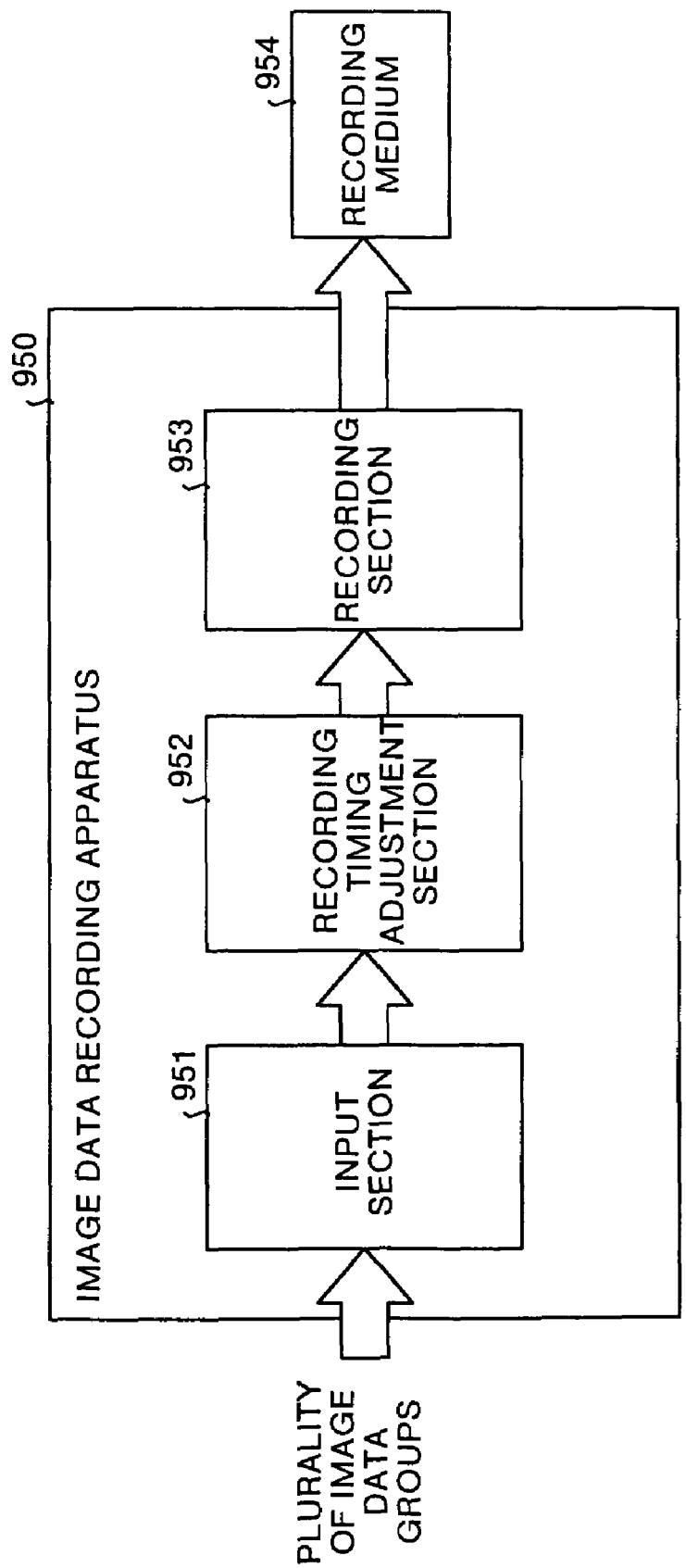
FIG. 16 is a block diagram schematically showing an image data recording apparatus in which an image data recording method according to the fifth embodiment of the present invention is applied.

FIG. 16 is a block diagram schematically showing an image data recording apparatus 950 in which an image data recording method according to the fifth embodiment of the present invention is applied. The image data recording apparatus 950 comprises an input section 951 which receives the image data to be recorded at the same recording timing, a recording timing adjustment apparatus 952 for receiving image data input from the input section 951 and performing recording timing adjustment processing thereon, and a recording section 953 which receives image data which has undergone recording timing adjustment in the recording timing adjustment section 952 and records this data on a recording medium 954. The image data processed by the image data recording apparatus 950 has an image format in which the amount of data changes with the amount of change in an image. Furthermore, the recording medium 954 is a medium in which the recording position changes with the passage of time such as video recording tape, MO, DVD, and a CD.

The image data may be input into the input section 951 via wired communication or wireless communication. Alternatively, a different method may be used for inputting each group of image data. Namely, the input section 951 may be provided with a function for receiving image data input at the same time as image data for recording at the same image timing.

Figure 17:
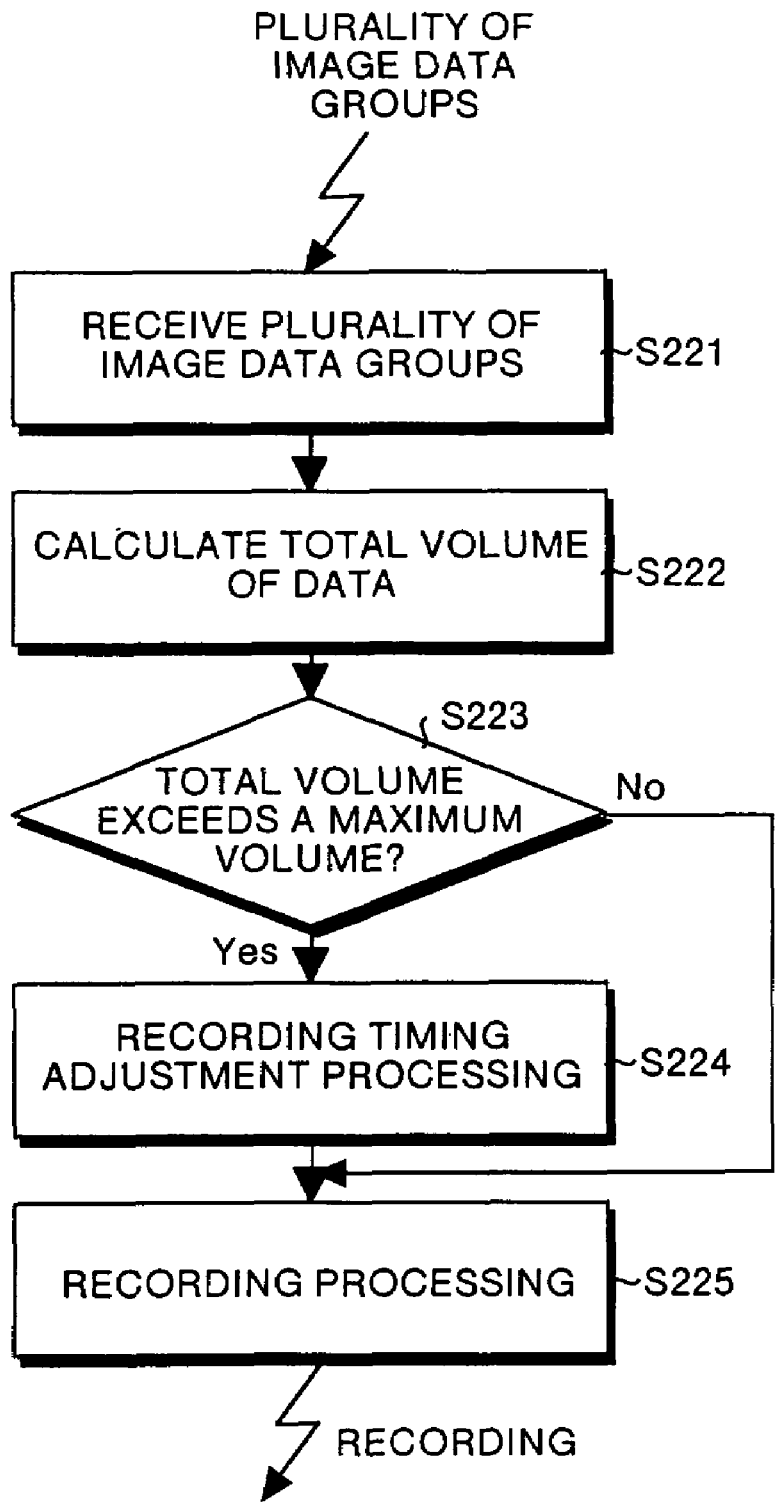
FIG. 17 is a flow chart showing image data recording processing according to the fifth embodiment.

The operation of the image data recording apparatus 950 will now be described. FIG. 17 is a flow chart showing image data recording processing according to the fifth embodiment. To begin with, a plurality of groups of image data are received by the input section 951 and the plurality of groups of image data received at the same time are then output to the recording timing adjustment section 952 as image data for recording at the same recording timing (step S221).

The recording timing adjustment section 952 adds the volume of data of each of the groups of image data for recording at the same recording timing received from the input section 951 and calculates the total volume of the data (step S222). It is then determined whether or not the total volume exceeds a maximum volume of the amount of data that can be recorded at a recording position on the recording medium 954 used by the recording section 953 (step S223). If the total volume does not exceed the maximum volume, the routine proceeds to step S225, and the plurality of groups of image data are recorded at the same recording timing onto the recording medium 954 in the recording section 953.

If, on the other hand, the total volume does exceed the maximum volume, the routine proceeds to step S224 and recording timing adjustment processing is executed. Namely, the recording timing of at least one group of the image data from among the plurality of groups of image data input by the input section 951 is shifted temporally forwards or backwards within a time span which is undetectable by the human eyes and is then output to the recording section 953.

As described above, according to the fifth embodiment, even when the image data is data whose amount changes with the amount of change in the image, it is possible to efficiently record a plurality of groups of image data simultaneously and to ensure that necessary image data is recorded.

In the fifth embodiment, a case has been explained in which a plurality of groups of image data are recorded. However, even when a single group of image data is recorded, if the image data is data whose amount changes with the amount of change in the image, it is, of course, possible to efficiently record the image data simultaneously and to ensure that necessary image data is recorded.

As has been described above, in the image data transmission method according to one aspect of the present invention, the image data transmission method of transmitting an image data, which image data has an image format in which an amount of data changes with only an amount of change in the image, the method comprising the steps of determining whether or not a total volume of image data transmitted at the same transmission timing exceeds a maximum volume that can be transmitted in a frequency band when transmitting at least one group of image data from a transmitter for transmitting image data or a relay apparatus for relaying image data using common wiring or frequency band having the same transmission wave; and when the total volume exceeds the maximum volume, temporally shifting forwards or backwards the transmission timing of a portion of the image data or at least one group of image data from among the image data to be transmitted at the same transmission timing within a time span which is undetectable by the human eyes. As a result, the effect is achieved that it is possible to provide an image data transmission method which can efficiently transmit image data and ensure that necessary image data is transmitted even when the image data is data whose amount changes with the amount of change in the image.

In the image data transmission method according to another aspect of the present invention, image data transmission method of transmitting an image data, which image data is provided with a time code representing a list of time series for each group of data forming the image data and comprising an image format in which an amount of data changes with an amount of change in an image, the method comprising the steps of determining whether or not a total volume of image data transmitted at the same transmission timing exceeds a maximum volume that can be transmitted in a frequency band when transmitting at least one group of image data from a transmitter for transmitting image data or a relay apparatus for relaying image data using common wiring or frequency band having the same transmission wave; when the total volume exceeds the maximum volume, temporally shifting forwards or backwards the transmission timing of a portion of the image data or at least one group of image data from among the image data to be transmitted at the same transmission timing; and setting the time code of the corresponding image data to −Δt when the transmission timing is shifted forwards by time Δt, or setting the time code of the corresponding image data to +Δt when the transmission timing is shifted backwards by time Δt. As a result, the effect is achieved that it is possible to provide an image data transmission method which can efficiently transmit image data and ensure that necessary image data is transmitted even when the image data is data whose amount changes with the amount of change in the image.

Further, when shifting the transmission timing of the image data, a data or image having a high resolution is preferentially time shifted as compared to other data or image data. As a result, because, in other words, precedence is given to the shifting of detailed portions of the image, even if errors occur in restoring the image data, the effect is achieved that the adverse effects thereof can be kept to a minimum.

Further, as a unit of data forming the image data, the image format comprises a channel code for classifying image channels of the unit of data; a time code for specifying a playback timing of the unit of data; a resolution level representing a resolution of the unit of data; address data representing a position of image data of the unit of data within a screen; and display data for the unit of data. As a result, even when image data is transmitted using a plurality of channels, the effect is achieved that it is possible to ensure that the image data of the necessary channel is fetched by verifying the channel code at the receiver.

In the image data transmission method according to still another aspect of the present invention, image data transmission method of transmitting image data of different resolutions in separate transmission frequency bands using a plurality of transmission frequency bands when transmitting image data from a transmitter, the method comprising the steps of demanding or designating a transmission frequency band for reception by a receiver to said transmitter; and receiving image data of only a desired resolution by the said receiver. As a result, the effect is achieved that the optimum resolution requested by the receiver can be provided in real time.

Further, when transmitting image data of different resolutions in separate transmission frequency bands, low resolution image data is transmitted in a low frequency band and high resolution data is transmitted in a high frequency band. As a result, the effect is achieved that the desired resolution can be easily acquired by the receiver requesting the frequency band.

Further, low resolution image data is transmitted at a slow transmission speed and high resolution data is transmitted at a high transmission speed. As a result, when the transmission speed drops, only low resolution images are sent and the effect is achieved that, although the resolution of the image is reduced, screen interruptions and the like can be avoided.

In the image data recording method according to still another aspect of the present invention, image data recording method of recording an image data on a recording medium, which image data has an image format in which an amount of data changes with only an amount of change in the image, the method comprising the steps of when recording at least one group of image data on the recording medium, determining whether or not a total volume of image data recorded simultaneously at the recording position exceeds a maximum volume of image data that can be recorded at that reading position, and when the total volume exceeds the maximum volume, shifting the recording timing of a portion of the data or at least one group of the image data from among the image data to be recorded simultaneously.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image data transmission method of transmitting a plurality of groups of image data, which image data has an image format in which an amount of data changes with only an amount of change in the image, the method comprising the steps of:
   determining whether or not a total volume of image data from said plurality of groups of image data that is transmitted through a frequency band at the same transmission timing exceeds a maximum volume that can be transmitted in the frequency band when transmitting image data from a transmitter for transmitting image data or a relay apparatus for relaying image data using common wiring or frequency band having the same transmission wave; and
   when the total volume from said plurality of groups of image data exceeds the maximum volume, temporally and selectively shifting either forwards or backwards the transmission timing of at least one group of the plurality of groups of image data from among the image data to be transmitted at the same transmission timing within a time span which is undetectable by the human eyes.

2. An image data transmission method of transmitting a plurality of groups of image data, which image data has an image format in which an amount of data changes with only an amount of change in the image, the method comprising the steps of:
   determining whether or not a total volume of image data from said plurality of groups of image data that is transmitted through a frequency band at the same transmission timing exceeds a maximum volume that can be transmitted in the frequency band when transmitting image data from a transmitter for transmitting image data or a relay apparatus for relaying image data using common wiring or frequency band having the same transmission wave; and
when the total volume from said plurality of groups of image data exceeds the maximum volume, temporally shifting forwards or backwards the transmission timing of at least one group of the plurality of groups of image data from among the image data to be transmitted at the same transmission timing within a time span which is undetectable by the human eyes;

wherein, when shifting the transmission timing of the image data, a data or image having a high resolution is preferentially time shifted as compared to other data or image data.

3. An image data transmission method of transmitting a plurality of groups of image data, which image data has an image format in which an amount of data changes with only an amount of change in the image, the method comprising the steps of:
   determining whether or not a total volume of image data from said plurality of groups of image data that is transmitted through a frequency band at the same transmission timing exceeds a maximum volume that can be transmitted in the frequency band when transmitting image data from a transmitter for transmitting image data or a relay apparatus for relaying image data using common wiring or frequency band having the same transmission wave; and
   when the total volume from said plurality of groups of image data exceeds the maximum volume, temporally shifting forwards or backwards the transmission timing of at least one group of the plurality of groups of image data from among the image data to be transmitted at the same transmission timing within a time span which is undetectable by the human eyes;
   wherein, as a unit of data forming the image data, the image format comprises a channel code for classifying image channels of the unit of data; a time code for specifying a playback timing of the unit of data; a resolution level representing a resolution of the unit of data; address data representing a position of image data of the unit of data within a screen; and display data for the unit of data.

4. An image data transmission method of transmitting a plurality of groups of image data, which image data is provided with a time code representing a list of time series for each group of data forming the image data and comprising an image format in which an amount of data changes with an amount of change in an image, the method comprising the steps of:
   determining whether or not a total volume of image data from said plurality of groups of image data that is transmitted through a frequency band at the same transmission timing exceeds a maximum volume that can be transmitted in the frequency band when transmitting at least one group of image data from a transmitter for transmitting image data or a relay apparatus for relaying image data using common wiring or frequency band having the same transmission wave;
   when the total volume from said plurality of groups of image data exceeds the maximum volume, temporally shifting forwards or backwards the transmission timing of a portion of the image data or at least one group of image data from among the plurality of groups of image data to be transmitted at the same transmission timing; and
   setting the time code of the corresponding image data to $-\Delta t$ when the transmission timing is shifted forwards by time $\Delta t$, or setting the time code of the corresponding image data to $+\Delta t$ when the transmission timing is shifted backwards by time $\Delta t$.

5. The image data transmission method according to claim 4, wherein, when shifting the transmission timing of the image data, a data or image having a high resolution is preferentially time shifted as compared to other data or image data.

6. The image data transmission method according to claim 4, wherein, as a unit of data forming the image data, the image format comprises a channel code for classifying image channels of the unit of data; a time code for specifying a playback timing of the unit of data; a resolution level representing a resolution of the unit of data; address data representing a position of image data of the unit of data within a screen; and display data for the unit of data.

7. An image data transmission method of transmitting image data of different resolutions each in a separate transmission frequency band using a plurality of transmission frequency bands when transmitting image data from a transmitter to a receiver, the method comprising the steps of:
   demanding or designating a one of the transmission frequency bands for reception from the receiver to the transmitter;
   transmitting the image data of one of the different resolutions corresponding to the transmission frequency band demanded or designated by the receiver from the transmitter to the receiver; and
   receiving the image data of the one of the different resolutions at the receiver.

8. The image data transmission method according to claim 7, wherein, when transmitting image data of different resolutions in separate transmission frequency bands, low resolution image data is transmitted in a low frequency band and high resolution data is transmitted in a high frequency band.

9. The image data transmission method according to claim 7, wherein low resolution image data is transmitted at a relatively slower transmission speed and high resolution data is transmitted at a relatively higher transmission speed.

10. An image data recording method of recording a plurality of groups of image data on a recording medium, each group of image data representing a different independent program, said image data having an image format in which an amount of data changes with only an amount of change in the image, the method comprising the steps of:
    when recording image data on the recording medium, determining whether or not a total volume of image data from said plurality of groups of image data that is recorded simultaneously at the recording position exceeds a maximum volume of image data that can be recorded at that reading position; and
    when the total volume from said plurality of groups of image data exceeds the maximum volume, shifting the recording timing of at least one group of the plurality of groups of the image data from among the image data to be recorded simultaneously.

11. An image data transmission apparatus which transmits a plurality of groups of image data, which image data has an image format in which an amount of data changes with only an amount of change in the image, said apparatus comprising:
    an input unit which receives the image data transmitted from a transmitter or a relay apparatus for relaying image data using common wiring or frequency band having the same transmission wave;
    a summing unit which adds the volume of the image data received by said input unit at the same transmission timing;
    a determining unit which determines whether the total volume of image data from said plurality of groups of image data to be transmitted through a frequency band that is calculated by said summing unit exceeds a specified maximum volume of data which can be transmitted in the frequency band; and a shifting unit which temporally and selectively shifts the timing of transmission of at least one group of the plurality of groups of image data from among the image data to be transmitted at the same transmission timing either forwards or backwards within a time span which is undetectable by the human eyes when said determining unit determines that the total volume from said plurality of groups of image data exceeds the maximum volume.

12. An image data recording apparatus which records a plurality of groups of image data on a recording medium, each group of image data representing a different independent program, said image data having an image format in which an amount of data changes with only an amount of change in the image, said apparatus comprising:

an input unit which receives the image data;

a summing unit which adds the volume of the image data received by said input unit at the same transmission timing;

a determining unit which determines whether the total volume of image data from said plurality of groups of image data that is calculated by said summing unit exceeds a maximum volume of image data that can be recorded at that reading position; and a shifting unit which temporally shifts the recording timing of at least one group of the plurality of groups of the image data from among the image data to be recorded simultaneously when said determining unit determines that the total volume from said plurality of groups of image data exceeds the maximum volume.

* * * * *